US011245608B1

(12) United States Patent
Kumar et al.

(10) Patent No.: US 11,245,608 B1
(45) Date of Patent: Feb. 8, 2022

(54) TUNNEL PROCESSING DISTRIBUTION BASED ON TRAFFIC TYPE AND LEARNED TRAFFIC PROCESSING METRICS

(71) Applicant: Juniper Networks, Inc., Sunnyvale, CA (US)

(72) Inventors: Rajneesh Kumar, Bengaluru (IN); Peyush Gupta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/948,301

(22) Filed: Sep. 11, 2020

(51) Int. Cl.
*G06F 15/16* (2006.01)
*H04L 12/26* (2006.01)
*H04L 12/911* (2013.01)
*H04L 12/721* (2013.01)

(52) U.S. Cl.
CPC ...... *H04L 43/0888* (2013.01); *H04L 43/0882* (2013.01); *H04L 43/0894* (2013.01); *H04L 45/123* (2013.01); *H04L 45/124* (2013.01); *H04L 47/825* (2013.01)

(58) Field of Classification Search
CPC ............. H04L 43/0888; H04L 43/0894; H04L 47/825; H04L 43/0882
See application file for complete search history.

(56) References Cited

U.S. PATENT DOCUMENTS

| | | | | |
|---|---|---|---|---|
| 7,760,636 B1* | 7/2010 | Cheriton | ............. | H04L 12/4633 370/235 |
| 8,811,401 B2* | 8/2014 | Stroud | .................... | H04L 47/00 370/392 |
| 9,565,167 B2* | 2/2017 | Roch | ..................... | H04L 47/125 |
| 9,813,343 B2 | 11/2017 | Williams et al. | | |
| 10,292,197 B1* | 5/2019 | Bonn | .................. | H04L 12/1403 |
| 10,623,321 B2* | 4/2020 | Mehra | ................... | H04L 47/125 |
| 10,958,620 B1* | 3/2021 | Wei | ..................... | H04L 45/7453 |
| 2005/0216729 A1* | 9/2005 | Joels | ....................... | H04L 12/66 713/153 |
| 2012/0254443 A1* | 10/2012 | Ueda | ..................... | G06F 9/5083 709/226 |
| 2014/0025823 A1* | 1/2014 | Szabo | ..................... | H04L 43/16 709/226 |
| 2016/0205029 A1* | 7/2016 | Sugunadass | ........ | H04L 43/0882 370/236 |
| 2017/0269911 A1* | 9/2017 | Barsness | .................... | G06F 8/20 |
| 2018/0069924 A1* | 3/2018 | Tumuluru | ............. | G06F 9/5077 |
| 2018/0213018 A1* | 7/2018 | Madani | ................ | H04L 67/2804 |
| 2019/0042298 A1* | 2/2019 | Sunku | .................... | G06F 9/5027 |

(Continued)

*Primary Examiner* — Hieu T Hoang

(74) *Attorney, Agent, or Firm* — Harrity & Harrity, LLP

(57) ABSTRACT

In some implementations, a network device may determine throughput rate metrics for a plurality of processing units of the network device that are processing network traffic of a network. The network device may maintain the throughput rate metrics in a status table associated with the plurality of processing units. The network device may receive tunnel traffic associated with a particular tunnel of the network. The network device may determine, based on a characteristic of the tunnel traffic, a potential throughput rate associated with processing the tunnel traffic. The network device may direct the tunnel traffic to a particular processing unit, of the plurality of processing units, based on the potential throughput rate and the throughput rate metrics indicated in the status table.

20 Claims, 11 Drawing Sheets

(56) References Cited

U.S. PATENT DOCUMENTS

| | | | |
|---|---|---|---|
| 2019/0109791 A1* | 4/2019 | Mehra | H04L 45/74 |
| 2019/0140957 A1* | 5/2019 | Johansson | H04L 47/741 |
| 2019/0199647 A1* | 6/2019 | Gupta | H04L 47/125 |
| 2019/0260609 A1* | 8/2019 | Zhang | H04L 47/125 |
| 2020/0137151 A1* | 4/2020 | Chi | H04L 67/1008 |

* cited by examiner

TUNNEL PROCESSING DISTRIBUTION BASED ON TRAFFIC TYPE AND LEARNED TRAFFIC PROCESSING METRICS

BACKGROUND

Load balancing is a technique for distributing loads across multiple computing resources, such as computers, network links, or central processing units. Load balancing can be performed by one or more load balancing techniques, such as a random choice technique, an Internet Protocol (IP) address hashing technique, and/or a least connections technique.

SUMMARY

In some implementations, a method includes determining, by a network device, throughput rate metrics for a plurality of processing units of the network device that are processing network traffic of a network; maintaining, by the network device, the throughput rate metrics in a status table associated with the plurality of processing units; receiving, by the network device, tunnel traffic associated with a particular tunnel of the network; determining, by the network device and based on a characteristic of the tunnel traffic, a potential throughput rate associated with processing the tunnel traffic; and directing, by the network device, the tunnel traffic to a particular processing unit, of the plurality of processing units, based on the potential throughput rate and the throughput rate metrics indicated in the status table.

In some implementations, a network device includes one or more memories; a plurality of processing units; and one or more processors to: monitor a first throughput rate associated with first tunnel traffic being processed by a first processing unit of the plurality of processing units, wherein the first tunnel traffic is associated with a first tunnel of a network; detect, based on the first throughput rate, an overload condition associated with the first processing unit processing the first tunnel traffic; determine, based on detecting the overload condition, throughput rate metrics for the plurality of processing units; select, based on the throughput rate metrics and the first throughput rate, a second processing unit from the plurality of processing units; and redirect, from the first processing unit to the second processing unit, the first tunnel traffic to the second processing unit.

In some implementations, a non-transitory computer-readable medium storing a set of instructions includes one or more instructions that, when executed by one or more processors of a network device, cause the network device to: determine a maximum throughput rate of a processing unit at maximum load; determine a current load of the processing unit; determine a throughput rate metric associated with the processing unit based on the current load and the maximum throughput rate; store the throughput rate metric and an identifier of the processing unit in a status table that is configured to maintain throughput rate metrics for a plurality of processing units of the network device; and direct tunnel traffic, associated with a tunnel of a network, to the processing unit according to the throughput rate metrics indicated in the status table.

DETAILED DESCRIPTION

Figure 1A:
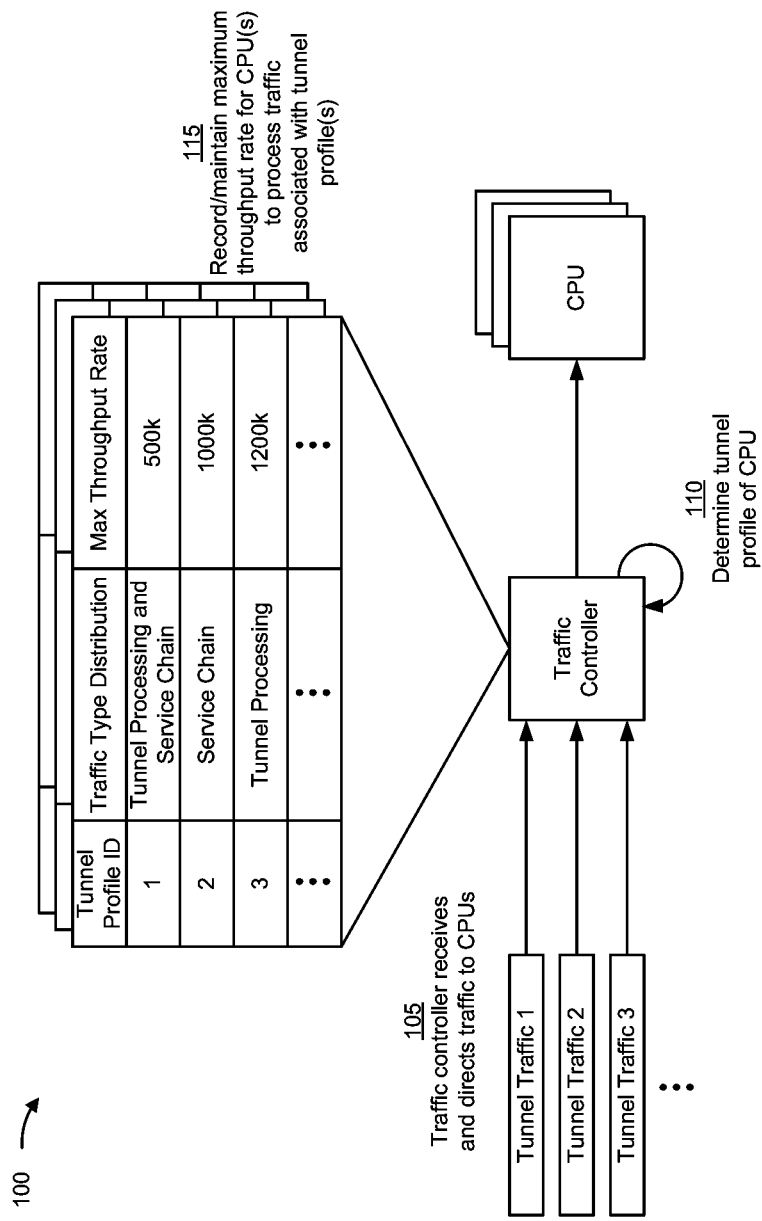
FIGS. 1A-1C are diagrams of one or more example implementations described herein.

The following detailed description of example implementations refers to the accompanying drawings. The same reference numbers in different drawings may identify the same or similar elements.

A system may perform load balancing of processing threads based on the load on each of the processing threads. For example, when a new task is to be processed by the system, the system may perform load balancing by distributing the task to a processing thread with the smallest load relative to the other processing threads. However, performing load balancing based on the load of each of the processing threads may fail to account for a processing unit's ability to perform a task. For example, a first processing unit may be able to process a type of network traffic faster and/or more efficiently than a second processing unit based on a state of the processing units, based on the services that are being provided to network traffic by the processing units, and/or based on other factors. Thus, performing load balancing based on the load of each of the processing threads may result in a task being performed by a processing unit that is slower and/or less efficient at performing the task relative to another processing unit. Utilizing a slower and/or less efficient processing unit to perform a task may waste computing resources (e.g., processing resources, memory resources, and/or communication resources) that otherwise would be conserved by utilizing a faster and/or more efficient processing unit to perform the task.

Some implementations described herein relate to a network device that performs load balancing based on a variety of factors, such as a configuration of a processing unit, a service being provided by the processing unit, a rate at which the processing unit is able to process a particular type of network traffic, and/or other factors. For example, the network device may determine throughput rate metrics for a plurality of processing units of the network device. The throughput rate metrics may indicate a maximum throughput rate under the current conditions of the plurality of processing units. The network device may maintain a throughput rate status table associated with the plurality of processing units based on determining the throughput rate metrics. Upon receiving network traffic associated with a particular tunnel of a network, the network device may determine a potential throughput rate associated with processing the network traffic based on a characteristic of the network traffic. For example, the network device may determine the potential throughput rate associated with processing the network traffic based on a type of the network traffic and/or a service to be provided to the network traffic. The network device may direct the network traffic to a particular processing unit, of the plurality of processing units, based on the potential throughput rate and the throughput rate metrics indicated in the status table.

In this way, the network device may perform load balancing based on a processing unit's ability to process particular network traffic received by the network device. By performing load balancing based on a processing unit's ability to process the particular network traffic, the network device may cause the network traffic to be processed by a processing unit that is faster and/or more efficient at processing the particular network traffic relative to other processing units. Thus, the network device may conserve computing resources that otherwise would have been wasted by utilizing a relatively slower and/or less efficient processing unit to process the particular network traffic.

Figure 1B:
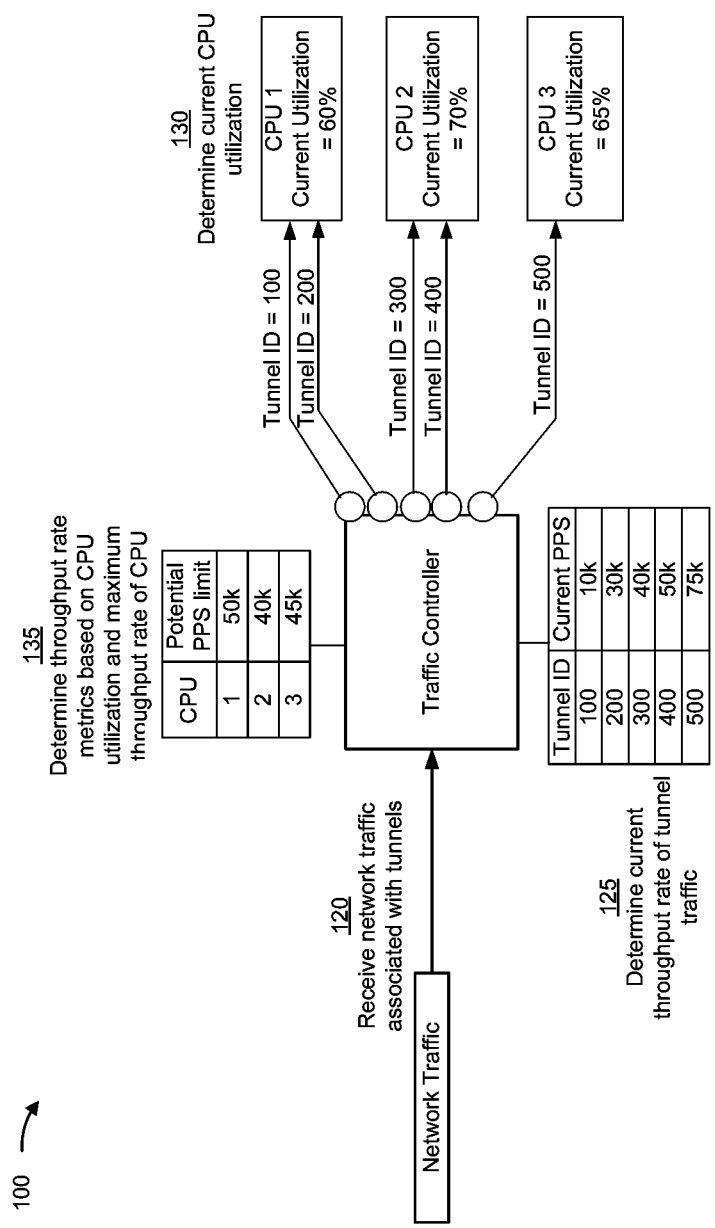
Figure 1C:
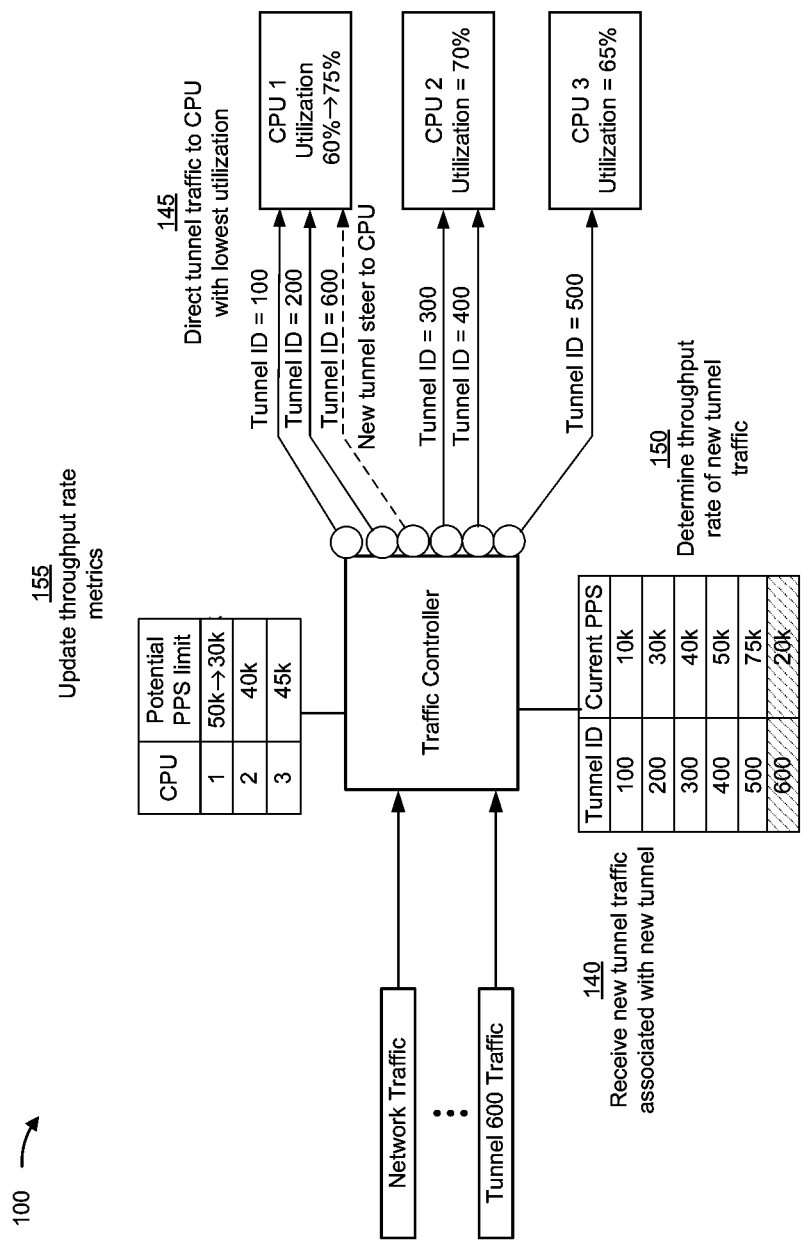

FIGS. 1A-1C are diagrams of one or more example implementations 100 described herein. As shown in FIGS. 1A-1C, a traffic controller of a network device may be configured to receive and direct traffic to a plurality of CPUs of the network device, as described herein.

As shown in FIG. 1A, and by reference number 105, the traffic controller receives and directs tunnel traffic to the CPUs. The tunnel traffic may be received via a group of tunnels used to transmit traffic between endpoint devices via the network device. The endpoint devices may include a client device, a server device, a security device (e.g., a device implementing a firewall), and/or another type of device.

In some implementations, the tunnel traffic may be initial traffic received by the network device, and the traffic controller may direct the tunnel traffic to the CPUs based on a load balancing scheme, such as a round robin distribution scheme, a simple hash load balancing scheme, and/or another type of load balancing scheme.

In some implementations, the traffic controller may direct the traffic to the CPUs based on a type of the tunnel traffic. For example, the tunnel traffic may include traffic associated with tunnel processing (e.g., traffic for which a CPU routes toward a destination associated with the traffic, without performing a service) and/or traffic associated with a service chain (e.g., traffic for which a CPU performs a service, such as a policy enforcement service, a deep packet inspection, and/or another type of service). The traffic controller may determine a type of traffic associated with the tunnel traffic and may direct the tunnel traffic to a particular CPU, of the plurality of CPUs, based on the type of traffic.

As shown by reference number 110, the traffic controller determines a tunnel profile of a CPU. The tunnel profile may include a tunnel identifier associated with the tunnel, information identifying a type of traffic being transmitted via the tunnel, and/or information identifying a maximum throughput rate of the CPU for the tunnel. The maximum throughput rate may be a maximum quantity of packets per second that can be processed by the CPU.

In some implementations, the traffic controller determines the maximum throughput rate based on a processing time per packet associated with the CPU processing traffic transmitted via the tunnel. The maximum throughput rate of the CPU may not be a direct function of CPU utilization. As an example, the CPU may perform processing on packets transmitted via the tunnel. The processing may require a quantity of input/output operations. The input/output operations may cause the CPU to be idle for a period of time. For example, the CPU may be idle while waiting for a resource (e.g., a lock, a time, and/or another type of resource) required to complete the processing of the packet. The period of time for which the CPU is idle may prevent the maximum throughput rate from increasing beyond a certain limit even when the CPU is not operating at a maximum load.

In some implementations, the traffic controller determines the processing time per packet for the tunnel based on a time that a packet enters the tunnel and a time that the packet leaves the tunnel. For example, the traffic controller may determine the processing time per packet using time stamping at an ingress and an egress of the tunnel. The traffic controller may determine a first time corresponding to a time at which a packet entered the tunnel and a second time corresponding to a time at which the packet exited the tunnel, based on time stamping the packet at the ingress and the egress of the tunnel. The traffic controller may determine the processing time for the packet based on the first time and the second time. For example, the traffic controller may subtract the first time from the second time to determine an amount of time associated with processing the packet.

In some implementations, the traffic controller may predict the maximum throughput rate for the tunnel based on the processing time per packet for the tunnel. For example, the traffic controller may determine a maximum quantity of packets that the CPU is able to process in one second at maximum load based on the processing time per packet for the tunnel (e.g., by dividing one second by the processing time per packet for the tunnel).

Alternatively, and/or additionally, the traffic controller may determine the maximum throughput rate based on monitoring the CPU. For example, the traffic controller may monitor a utilization of the CPU and may determine that the CPU is currently at maximum load. In some implementations, the traffic controller may determine that the CPU is currently at the maximum load based on a quantity of packets stored in a queue associated with the CPU. For example, the CPU may determine that the quantity of packets stored in the queue satisfies a packet quantity threshold. The traffic controller may determine that the CPU is operating at the maximum load based on the quantity of packets stored in the queue satisfying the packet quantity threshold. The traffic controller may determine a quantity of packets processed per second by the CPU while the CPU is at the maximum load. The traffic controller may determine the maximum throughput rate based on the quantity of packets processed per second by the CPU while the CPU is at the maximum load.

In some implementations, the traffic controller determines the maximum throughput rate for a CPU based on the maximum throughput rate determined for another CPU. For example, the traffic controller may determine that a first CPU and a second CPU, of the plurality of CPUs of the network device, are the same type of CPU and/or process the same type of traffic. The traffic controller may determine that the maximum throughput rate for the first CPU is the same as the maximum throughput rate determined for the second CPU based on the first CPU and the second CPU being the same type of CPU and/or based on the first CPU and the second CPU processing the same type of traffic.

As shown by reference number 115, the traffic controller records and maintains a maximum throughput rate for the CPUs to process traffic associated with one or more tunnel profiles. The traffic controller may record and maintain the throughput rate for the CPUs in a data structure (e.g., a database, a table, a list, and/or another type of data structure) stored in a memory of the network device. The data structure may include a group of tables. A table, of the group of tables, may be associated with a particular CPU of the plurality of CPUs of the network device. The table may include an entry for each tunnel associated with the CPU. The entry for a tunnel may include information identifying the tunnel associated with the entry (e.g., an identifier associated with the tunnel), information identifying a type of traffic being transmitted via the tunnel (e.g., tunnel processing traffic and/or service chain traffic), and/or information identifying the maximum throughput rate associated with the tunnel.

As shown in FIG. 1B, and by reference number 120, the traffic controller receives network traffic associated with tunnels. The network traffic may include a plurality of packets. The traffic controller may identify a tunnel associated with a packet, of the plurality of packets. The traffic controller may identify a CPU associated with the identified tunnel. The traffic controller may direct the packet to the CPU to cause the CPU to forward the packet toward a destination of the packet via the tunnel.

As shown by reference number 125, the traffic controller determines a current throughput rate of tunnel traffic. In some implementations, the traffic controller periodically (e.g., every second) determines the current throughput rate of tunnel traffic for a tunnel. Alternatively, and/or additionally, the traffic controller may determine the current throughput rate of tunnel traffic for a tunnel based on an occurrence of an event, such as receiving network traffic associated with the tunnel, directing network traffic to a CPU associated with the tunnel, and/or a current utilization of the CPU satisfying a threshold utilization.

The current throughput rate of tunnel traffic for a tunnel may correspond to a quantity of packets per second being transmitted via the tunnel. In some implementations, the traffic controller utilizes a counter to determine the current throughput rate of tunnel traffic for the tunnel. For example, the CPU associated with the tunnel may increment a counter each time a packet is transmitted via the tunnel (e.g., each time a packet enters the tunnel and/or each time a packet exits the tunnel). The traffic controller may determine a first value of the counter at a first time. The traffic controller may determine a second value of the counter at a second time. The traffic controller may determine the throughput rate of tunnel traffic for the tunnel based on the first value, the second value, and an amount of time between the first time and the second time.

For example, the traffic controller may subtract the first value from the second value to determine a quantity of packets. The traffic controller may determine a quantity of seconds occurring between the first time and the second time. The traffic controller may determine the current throughput rate of the tunnel traffic for the tunnel based on dividing the quantity of packets by the quantity of seconds. The traffic controller may determine the current throughput rate of tunnel traffic for each tunnel associated with the network device.

As shown by reference number 130, the traffic controller determines current CPU utilization for the CPUs. In some implementations, the traffic controller periodically (e.g., every second) determines the current CPU utilization for the CPUs. Alternatively, and/or additionally, the traffic controller may determine the current CPU utilization for the CPUs based on an occurrence of an event, such as receiving network traffic associated with a tunnel associated with a CPU, directing network traffic to the CPU, and/or a current throughput rate of tunnel traffic for a tunnel associated with the CPU satisfying a threshold throughput rate.

The traffic controller may determine the current CPU utilization for a CPU based on the current throughput rate of tunnel traffic for a tunnel associated with the CPU and the maximum throughput rate determined for the tunnel. The traffic controller may identify a tunnel profile associated with the tunnel. For example, the traffic controller may determine a tunnel identifier associated with the tunnel. The traffic controller may utilize the tunnel identifier to obtain the tunnel profile associated with the tunnel from the tunnel profiles recorded and maintained by the traffic controller in the data structure. The traffic controller may determine the maximum throughput rate determined for the tunnel based on information identifying the maximum throughput rate for the tunnel in the tunnel profile. The traffic controller may determine the current CPU utilization based on dividing the current throughput rate of tunnel traffic for the tunnel by the maximum throughput rate for the tunnel.

In some implementations, the CPU is associated with a plurality of tunnels. For example, as shown in FIG. 1B, CPU 1 is associated with two tunnels (e.g., Tunnel 100 and Tunnel 200). In these implementations, the traffic controller may determine a maximum throughput rate for each tunnel based on a respective tunnel profile associated with each tunnel. The traffic controller may determine a maximum throughput rate for the CPU based on the maximum throughput rate for each tunnel. For example, the traffic controller may determine the maximum throughput rate for the CPU 1 based on a sum of the maximum throughput rate for Tunnel 100 and the maximum throughput rate for Tunnel 200. The traffic controller may determine the current CPU utilization by dividing a sum of the respective current throughput rates of the plurality of tunnels associated with the CPU (e.g., the current throughput rate of Tunnel 100+the current throughput of tunnel 200) by the maximum throughput rate determined for the CPU.

As shown by reference number 135, the traffic controller determines throughput rate metrics based on the CPU utilization and the maximum throughput rate of the CPUs. The throughput rate metrics for a CPU may include a potential packets per second limit rate metric (e.g., potential PPS limit, as shown in FIG. 1B). The potential PPS limit may indicate an unused capacity of the CPU (e.g., an additional quantity of packets per second that can be transmitted via one or more tunnels associated with the CPU). The traffic controller may subtract the current utilization of the CPU from one hundred percent to determine a potential utilization associated with the CPU. The traffic controller may determine the potential PPS limit based on the potential utilization associated with the CPU.

As an example, as shown in FIG. 1B, the traffic controller determines that the CPU 1 has a current utilization of 60%. The traffic controller may determine the potential utilization of CPU 1 based on subtracting the current utilization from one hundred percent (e.g., 100%−60%=40%). The traffic controller may convert the potential utilization to a decimal (e.g., 0.40) and may determine a potential PPS limit of CPU 1 based on multiplying the maximum throughput rate by the decimal (e.g., 50,000 packets per second, as shown in FIG. 1B).

As shown in FIG. 1C, and by reference number 140, the traffic controller receives new tunnel traffic associated with a new tunnel. The traffic controller may select a CPU, of the plurality of CPUs of the network device, to associate with the new tunnel. In some implementations, the traffic controller selects the CPU based on the potential PPS limit associated with the CPU. For example, the traffic controller associates the new tunnel with a CPU having the largest potential PPS limit relative to the other CPUs.

In some implementations, the traffic controller selects the CPU based on a type of traffic transmitted via the tunnel. For example, the traffic controller may determine a type of traffic transmitted via the tunnel and may select a CPU configured to process the type of traffic, a CPU more efficient at processing the type of traffic relative to other CPUs, and/or a CPU currently associated with a tunnel transmitting the type of traffic.

In some implementations, the traffic controller determines that a CPU is more efficient at processing the type of traffic relative to other CPUs based on a throughput rate of a tunnel associated with the CPU. The traffic controller may identify a set of tunnels through which the type of traffic is transmitted. The traffic controller may determine a respective throughput rate for each tunnel of the set of tunnels. The traffic controller may identify a tunnel, of the set of tunnels, having the highest throughput rate relative to other tunnels included in the set of tunnels. The traffic controller may identify a CPU associated with the identified tunnel. The traffic controller may determine that the CPU is more efficient at processing the type of traffic relative to other CPUs associated with the other tunnels and/or is able to process the type of traffic faster than the other CPUs based on the CPU being associated with the tunnel having the highest throughput rate.

In some implementations, the traffic controller selects the CPU based on a CPU utilization of the CPU. For example, the traffic controller may determine a current CPU utilization for each of the CPUs and may select a CPU having the lowest current CPU utilization relative to the other CPUs.

The traffic controller may associate the new tunnel with the selected CPU. The traffic controller may direct traffic to the CPU based on associating the new tunnel with the selected CPU. For example, as shown by reference number 145, the traffic controller directs the tunnel traffic to a CPU (e.g., CPU 1, as shown in FIG. 1C) with a lowest CPU utilization relative to the other CPUs.

Directing the tunnel traffic to the selected CPU may cause the CPU utilization of the CPU to increase. For example, as shown in FIG. 1C, the CPU utilization of CPU 1 increases from 60% to 75% based on the traffic controller directing the tunnel traffic to CPU 1.

As shown by reference number 150, the traffic controller determines a throughput rate of the new tunnel traffic. The traffic controller may determine the throughput for the new tunnel traffic in a manner similar to that described above with respect to FIG. 1B. As shown in FIG. 1C, the traffic controller determines the throughput rate for the tunnel traffic of the new tunnel (e.g., Tunnel 600, as shown in FIG. 1C) to be 20,000 packets per second.

As shown by reference number 155, the traffic controller updates the throughput rate metrics. The traffic controller may update the throughput rate metrics based on determining the throughput rate of the new tunnel traffic. In some implementations, the traffic controller updates the throughput rate metrics based on determining an updated potential PPS limit for the selected CPU. The traffic controller may determine the updated potential PPS limit in a manner similar to that described above with respect to FIG. 1B. In some implementations, the traffic controller updates the potential PPS limit for the selected CPU by subtracting the current throughput rate of the new tunnel traffic for the new tunnel from the potential PPS limit for the selected CPU. For example, as shown in FIG. 1C, the traffic controller updates the potential PPS limit for CPU 1 from 50,000 packets per second to 30,000 packets per second.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2A:
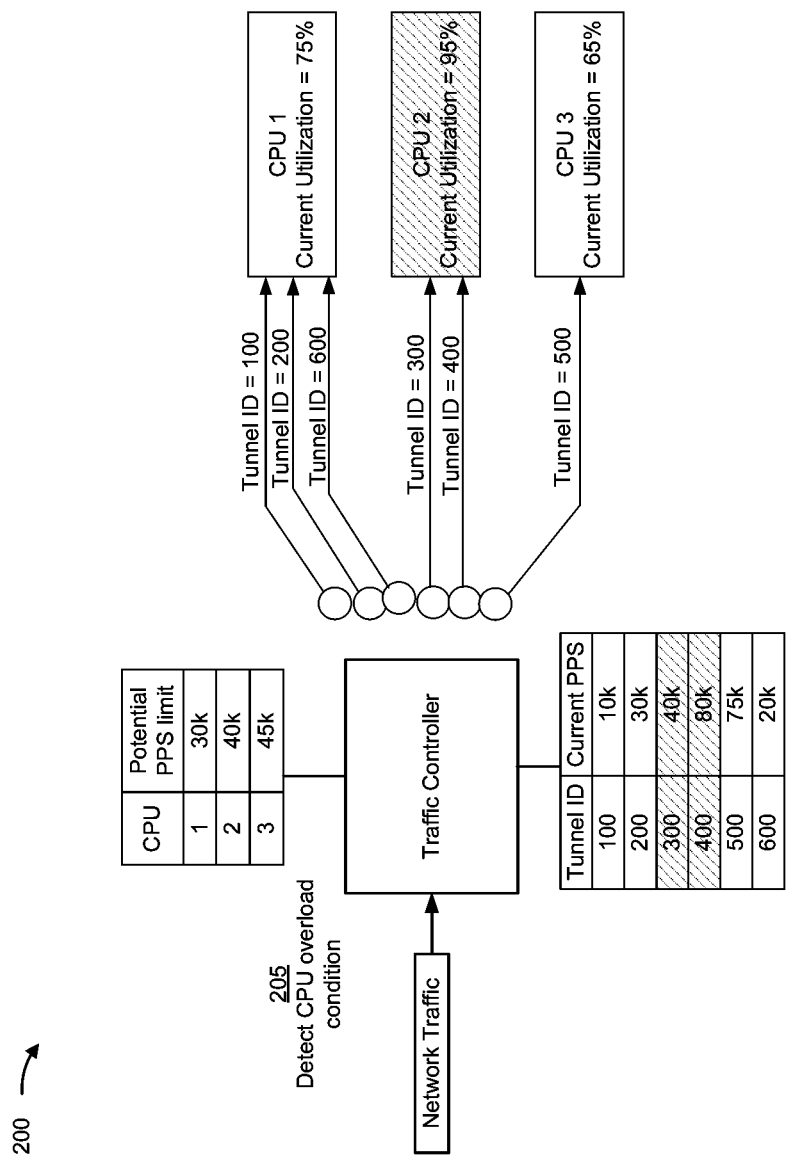
FIGS. 2A-2B are diagrams of one or more example implementations described herein.
Figure 2B:
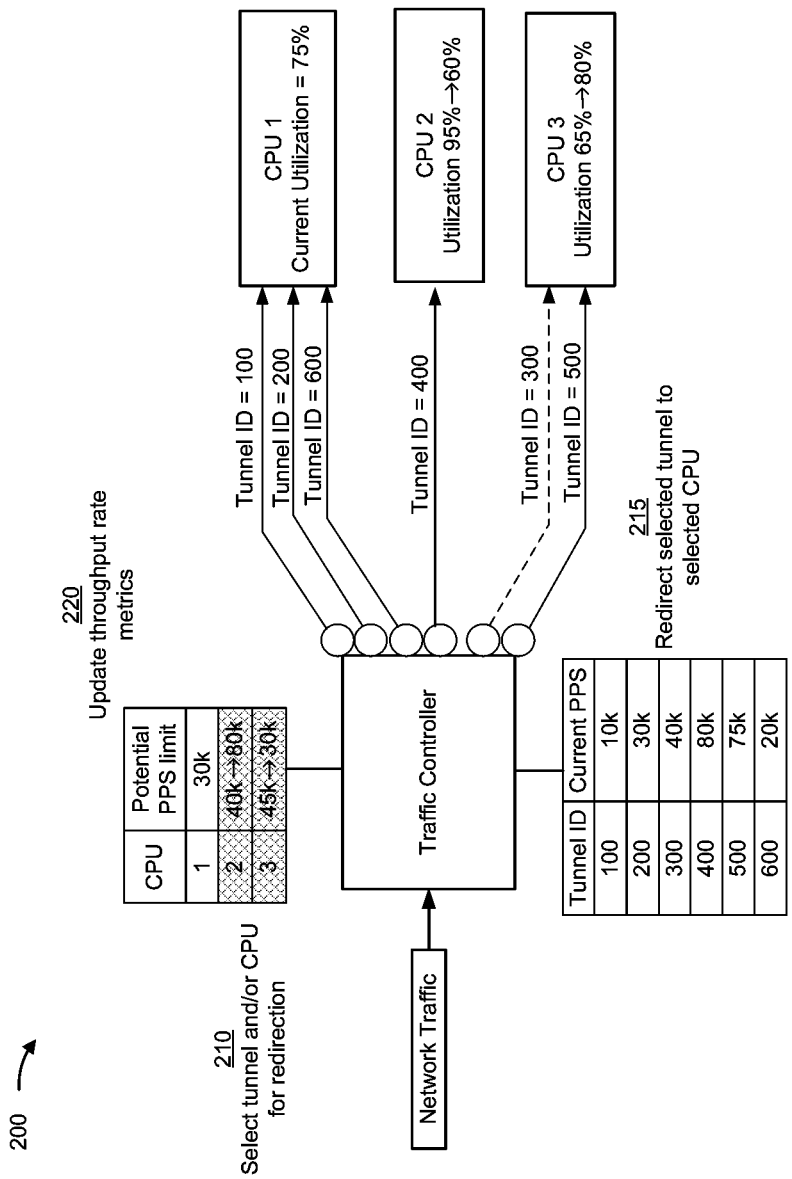

FIGS. 2A-2B are diagrams of one or more example implementations 200 described herein. As shown in FIGS. 2A-2B, a traffic controller of a network device may be configured to determine an occurrence of a CPU overload condition associated with a CPU of the network device and to redirect tunnel traffic based on the occurrence of the CPU overload condition, as described herein.

As shown in FIG. 2A, and by reference number 205, the traffic controller detects a CPU overload condition associated with a CPU (e.g., CPU 2, as shown in FIG. 2A). In some implementations, the traffic controller detects the CPU overload condition based on a current CPU utilization of a CPU. The traffic controller may determine the current CPU utilization of the CPU in a manner similar to that described above with respect to FIG. 1B. The controller may determine that the current CPU utilization of the CPU satisfies a threshold CPU utilization (e.g., 85%, 90%, 95%, and/or the like). The traffic controller may detect a CPU overload associated with the CPU based on the current CPU utilization satisfying the threshold CPU utilization.

In some implementations, the traffic controller detects the CPU overload condition based on a current throughput rate of a tunnel associated with a CPU. The traffic controller may determine the current throughput rate of a tunnel associated with a CPU in a manner similar to that described above with respect to FIG. 1B. The traffic controller may determine that the current throughput rate of the tunnel satisfies a threshold throughput rate. The traffic controller may detect a CPU overload condition associated with a CPU associated with the tunnel based on the current throughput rate satisfying the threshold throughput rate. For example, the traffic controller may detect the CPU overload condition based on the current packet processing speed of a CPU satisfying a threshold packet processing speed.

As an example, as shown in FIG. 2A, the traffic controller determines that the current throughput rate associated with tunnel 300 and tunnel 400 is 40,000 packets per second and 80,000 packets per second, respectively. The traffic controller may determine that the current throughput rate associated with tunnel 300 and/or tunnel 400 satisfies a threshold throughput rate. The traffic controller may determine a CPU associated with tunnel 300 and/or tunnel 400 (e.g., CPU2, as shown in FIG. 2A). The traffic controller may detect an overload condition associated with the CPU based on the CPU being associated with tunnel 300 and/or tunnel 400 and based on the current throughput rate associated with tunnel 300 and/or tunnel 400 satisfying the threshold throughput rate.

In some implementations, the traffic controller detects the CPU overload condition based on the potential PPS limit of a CPU. The traffic controller may determine the potential PPS limit of a CPU in a manner similar to that described above. The traffic controller may determine that the potential PPS limit satisfies a threshold PPS limit. The traffic controller may detect a CPU overload condition associated with the CPU based on the potential PPS limit satisfying the threshold PPS limit.

As shown in FIG. 2B, and by reference number 210, the traffic controller selects a tunnel and/or a CPU for redirection. The traffic controller may identify a group of one or more tunnels associated with the CPU for which the overload condition was detected. The traffic controller may determine a respective current throughput rate for each tunnel of the group of tunnels. The traffic controller may select a tunnel, from the group of tunnels, for redirection to another CPU based on the respective current throughput rate determined for each of the tunnels, a current CPU utilization of the other CPU, and/or a potential PPS limit of the other CPU.

The traffic controller may identify a first CPU, of the plurality of CPUs of the network device, having the lowest current CPU utilization relative to the other CPUs (e.g., CPU 3, as shown in FIG. 2A). The traffic controller may determine a potential PPS limit of the first CPU (e.g., 45,000 packets per second, as shown in FIG. 2A) based on the first CPU having the lowest current CPU utilization. The traffic controller may determine whether the potential PPS limit of the first CPU is greater than the current throughput rate determined for a tunnel included in the group of tunnels.

In some implementations, the traffic controller determines that the potential PPS limit of the first CPU is not greater than the current throughput rate determined for any of the tunnels included in the group of tunnels. The traffic controller may identify a second CPU, of the plurality of CPUs of the network device, having the next lowest current CPU utilization based on the potential PPS limit of the first CPU not being greater than the current throughput rate determined for any of the tunnels included in the group of tunnels. The traffic controller may determine the potential PPS limit of the second CPU and whether the potential PPS limit of the second CPU is greater than the current throughput rate determined for a tunnel included in the group of tunnels, in a manner similar to that described above.

In some implementations, the traffic controller determines that the potential PPS limit of the first CPU is greater than the current throughput rate determined for a first tunnel included in the group of tunnels. The traffic controller may select the first tunnel for redirection to the first CPU based on the potential PPS limit of the first CPU being greater than the current throughput rate determined for a tunnel included in the group of tunnels.

In some implementations, the traffic controller determines that the potential PPS limit of the first CPU is greater than the current throughput rates determined for a plurality of tunnels included in the group of tunnels. The traffic controller may select a tunnel, from the plurality of tunnels, for redirection to the first CPU based on the tunnel having the highest throughput rate relative to other tunnels included in the plurality of tunnels, based on the tunnel having the lowest throughput rate relative to the other tunnels, based on a type of traffic transmitted via the tunnel being the same as a type of traffic transmitted via a tunnel associated with the first CPU, and/or another factor associated with the tunnel and/or the first CPU.

As shown by reference number 215, the traffic controller redirects the selected tunnel to the selected CPU. For example, as shown in FIG. 2B, the traffic controller redirects tunnel 300 to CPU 3.

As shown by reference number 220, the traffic controller updates the throughput rate metrics. The traffic controller may determine an updated potential PPS limit and/or an updated current CPU utilization for the CPU from which the selected tunnel was redirected and/or the CPU to which the selected tunnel was redirected. As shown in FIG. 2B, the potential PPS limit for CPU 2 is updated from 40,000 packets per second to 80,000 packets per second and the current CPU utilization for CPU 2 was updated from 95% to 60% based on redirecting tunnel 300 to CPU 3. As also shown in FIG. 2B, the potential PPS limit for CPU 3 is updated from 45,000 packets per second to 30,000 packets per second and the current CPU utilization for CPU 3 was updated from 65% to 80%. The potential PPS limit of CPU 3 might not decrease by an amount corresponding to the current throughput of the tunnel 300 based on CPU 3 being more efficient at processing a type of traffic transmitted via tunnel 300 relative to CPU 2.

By redistributing tunnels based on a current utilization of the CPUs, over time, a CPU may become associated with tunnels transmitting a type of traffic that the CPU is most efficient at processing, relative to other types of traffic. In this way, the traffic controller may optimize the utilization of the plurality of CPUs of the network device, thereby conserving computing resources that otherwise would have been utilized by using less efficient CPUs to process the types of traffic.

As indicated above, FIGS. 2A-2B are provided as an example. Other examples may differ from what is described with regard to FIGS. 2A-2B. The number and arrangement of devices shown in FIGS. 2A-2B are provided as an example. In practice, there may be additional devices, fewer devices, different devices, or differently arranged devices than those shown in FIGS. 2A-2B. Furthermore, two or more devices shown in FIGS. 2A-2B may be implemented within a single device, or a single device shown in FIGS. 2A-2B may be implemented as multiple, distributed devices. Additionally, or alternatively, a set of devices (e.g., one or more devices) shown in FIGS. 2A-2B may perform one or more functions described as being performed by another set of devices shown in FIGS. 2A-2B.

Figure 3A:
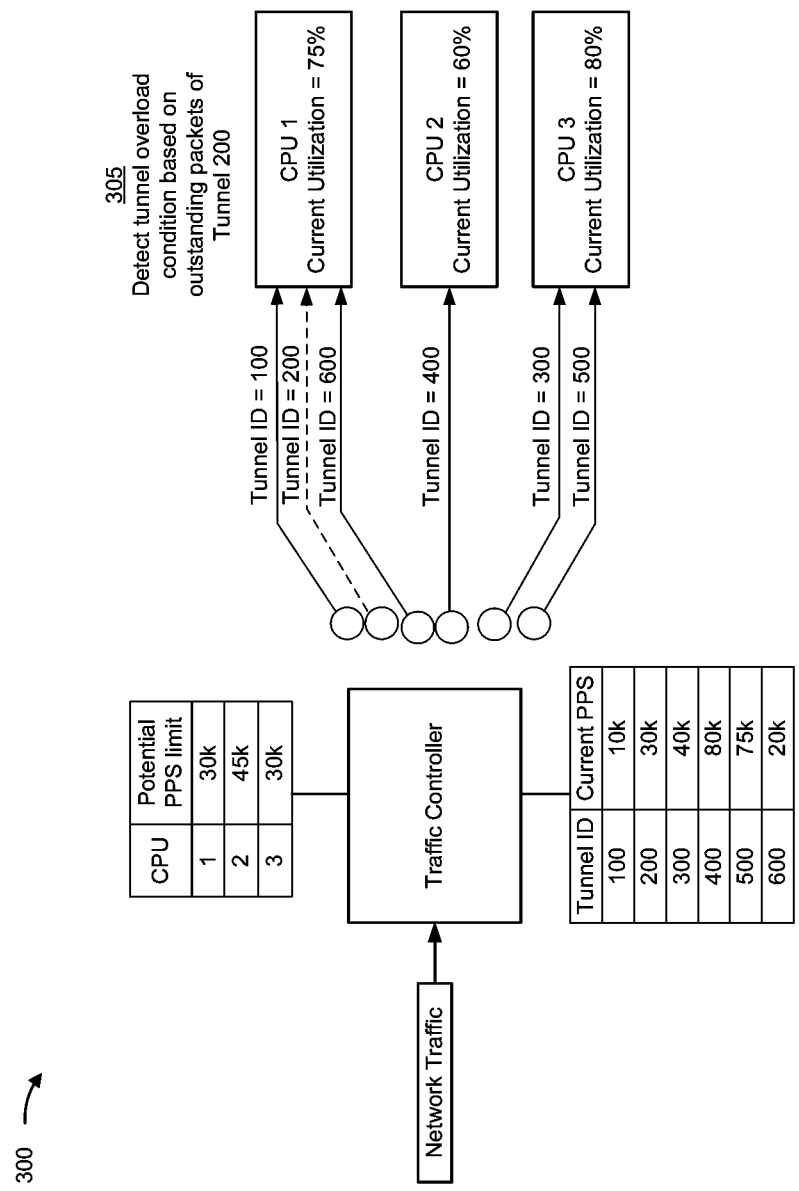
FIGS. 3A-3B are diagrams of one or more example implementations described herein.
Figure 3B:
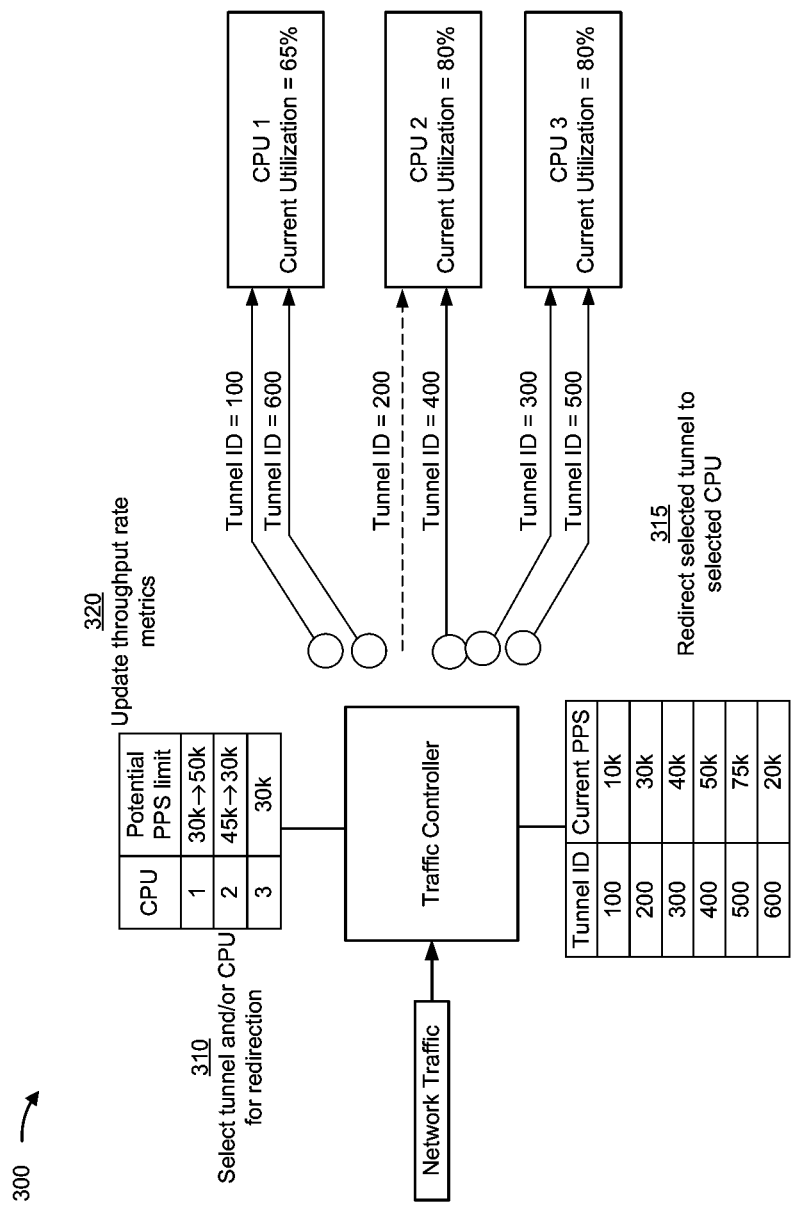

FIGS. 3A-3B are diagrams of one or more example implementations 300 described herein. As shown in FIGS. 3A-3B, a traffic controller of a network device may be configured to determine an occurrence of a tunnel overload condition associated with a tunnel and to redirect tunnel traffic based on the occurrence of the tunnel overload condition, as described herein.

As shown in FIG. 3A, and by reference number 305, the traffic controller detects a tunnel overload condition based on outstanding packets of tunnel 200. In some implementations, the traffic controller determines a quantity of outstanding packets associated with a tunnel (e.g., tunnel 200) based on a quantity of packets stored in an input queue associated with the tunnel. Packets redirected to a CPU associated with the tunnel may be stored in an input queue while waiting to be processed and/or transmitted through the tunnel. The traffic controller may determine that a quantity of packets stored in the input queue satisfies a threshold quantity. The traffic controller may detect a tunnel overload condition based on the quantity of packets satisfying the threshold quantity.

In some implementations, the traffic controller detects the tunnel overload condition based on a current CPU utilization of a CPU associated with the tunnel. The traffic controller may determine the current CPU utilization of a CPU in a manner similar to that described above. The traffic controller may determine that the current CPU utilization of the CPU satisfies a threshold CPU utilization. The traffic controller may detect the occurrence of a tunnel overload condition associated with a tunnel associated with the CPU based on the current CPU utilization of the CPU satisfying the threshold CPU utilization.

In some implementations, the traffic controller detects the tunnel overload condition based on the potential PPS limit of a CPU associated with the tunnel. The traffic controller may determine the potential PPS limit of the CPU in a manner similar to that described above. In some implementations, the traffic controller determines the potential PPS limit for the CPU based on determining that the current throughput rate of a tunnel associated with the CPU has increased and/or satisfies a threshold throughput rate. The traffic controller may determine that the potential PPS limit of the CPU satisfies a threshold potential PPS limit. The traffic controller may detect the tunnel overload condition based on the potential PPS limit of the CPU satisfying the threshold potential PPS limit.

As shown in FIG. 3B, and by reference number 310, the traffic controller selects a tunnel and/or a CPU for redirection. In some implementations, the traffic controller selects the tunnel and/or the CPU for redirection in a manner similar to that described above with respect to FIG. 2B.

As shown by reference number 315, the traffic controller redirects the selected tunnel to the selected CPU. As shown in FIG. 3B, the traffic controller redirects tunnel 200 to CPU 2.

As shown by reference number 320, the traffic controller updates the throughput metrics. The traffic controller may update the throughput metrics for the CPU from which the tunnel was directed (e.g., CPU 1) and/or the CPU to which the tunnel was directed (e.g., CPU 2). For example, as shown in FIG. 3B, the traffic controller updates the potential PPS limit for CPU 1 from 30,000 packets per second to 50,000 packets per second, and the traffic controller updates the potential PPS limit for CPU 2 from 45,000 packets per second to 30,000 packets per second.

As indicated above, FIGS. 3A-3B are provided as an example. Other examples may differ from what is described with regard to FIGS. 3A-3B. The number and arrangement of devices shown in FIGS. 3A-3B are provided as an example. In practice, there may be additional devices, fewer devices, different devices, or differently arranged devices than those shown in FIGS. 3A-3B. Furthermore, two or more devices shown in FIGS. 3A-3B may be implemented within a single device, or a single device shown in FIGS. 3A-3B may be implemented as multiple, distributed devices. Additionally, or alternatively, a set of devices (e.g., one or more devices) shown in FIGS. 3A-3B may perform one or more functions described as being performed by another set of devices shown in FIGS. 3A-3B.

Figure 4:
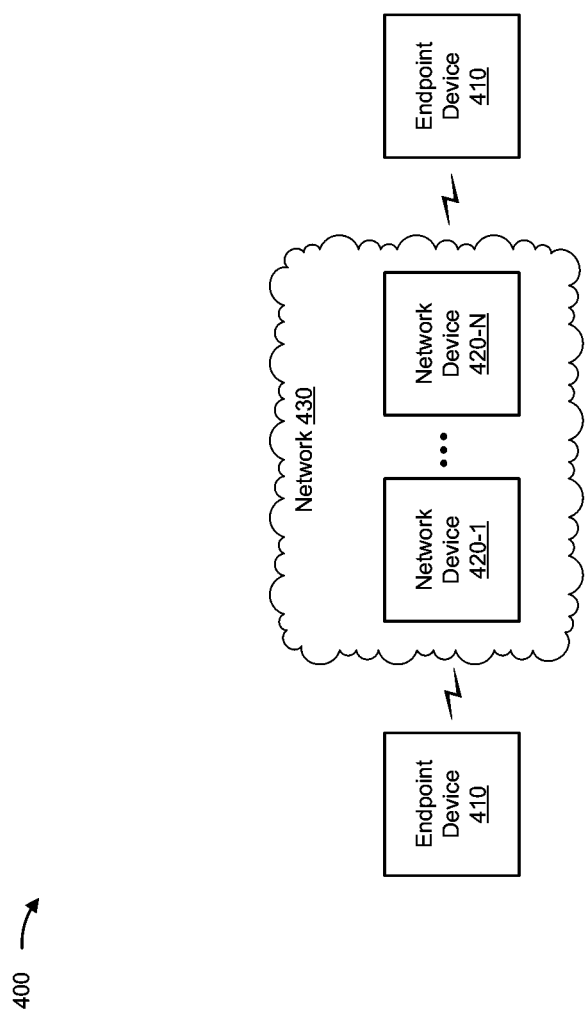
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an endpoint device 410, a group of network devices 420 (shown as network device 420-1 through network device 420-N), and a network 430. Devices of environment 400 may interconnect via wired connections, wireless connections, or a combination of wired and wireless connections.

Endpoint device 410 includes one or more devices capable of receiving, generating, storing, processing, and/or providing information, such as information described herein. For example, endpoint device 410 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 410 may receive network traffic from and/or may provide network traffic to other endpoint devices 410 via network 430 (e.g., by routing packets using network devices 420 as intermediaries).

Network device 420 includes one or more devices capable of receiving, processing, storing, routing, and/or providing traffic (e.g., a packet, other information or metadata, and/or the like) in a manner described herein. For example, network device 420 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 420 may include a gateway, a switch, a firewall, a hub, a bridge, a reverse proxy, a server (e.g., a proxy server, a cloud server, a data center server, and/or the like), a load balancer, and/or a similar device. In some implementations, network device 420 may be a physical device implemented within a housing, such as a chassis. In some implementations, network device 420 may be a virtual device implemented by one or more computer devices of a cloud computing environment or a data center. In some implementations, a group of network devices 420 may be a group of data center nodes that are used to route traffic flow through network 430.

Network 430 includes one or more wired and/or wireless networks. For example, network 430 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
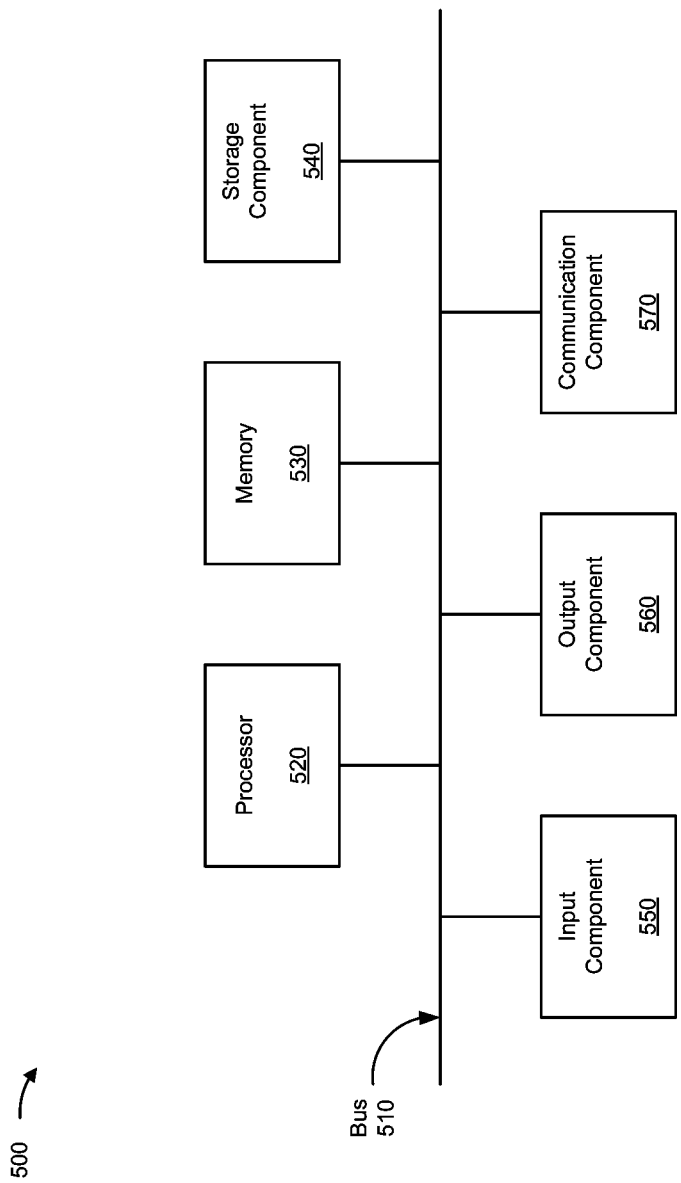
FIGS. 5-6 are diagrams of example components of one or more devices of FIG. 4.

FIG. 5 is a diagram of example components of a device 500, which may correspond to endpoint device 410 and/or network device 420. In some implementations, endpoint device 410 and/or network device 420 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, an actuator, and/or the like. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, an antenna, and/or the like.

Device 500 may perform one or more processes described herein. For example, a non-transitory computer-readable medium (e.g., memory 530 and/or storage component 540) may store a set of instructions (e.g., one or more instructions, code, software code, program code, and/or the like) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
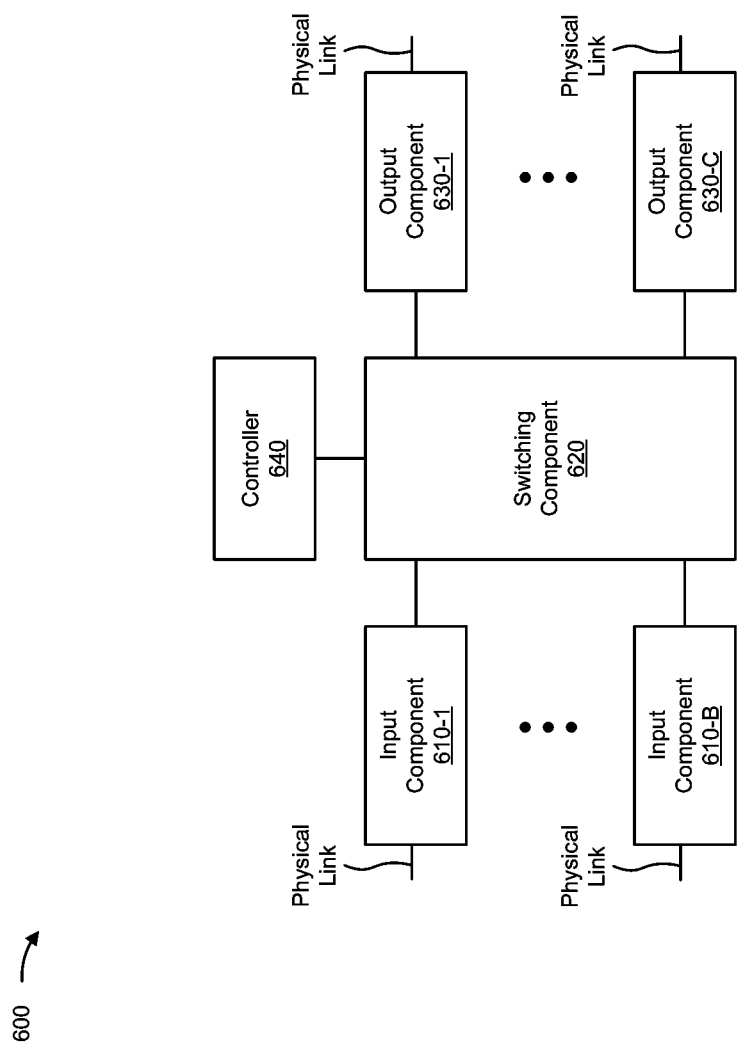

FIG. 6 is a diagram of example components of a device 600. Device 600 may correspond to network device 420 and/or the like. In some implementations, network device 420 and/or the like may include one or more devices 600 and/or one or more components of device 600. As shown in FIG. 6, device 600 may include one or more input components 610-1 through 610-B (B≥1) (hereinafter referred to collectively as input components 610, and individually as input component 610), a switching component 620, one or more output components 630-1 through 630-C (C≥1) (hereinafter referred to collectively as output components 630, and individually as output component 630), and a controller 640.

Input component 610 may be one or more points of attachment for physical links and may be one or more points of entry for incoming traffic, such as packets. Input component 610 may process incoming traffic, such as by performing data link layer encapsulation or decapsulation. In some implementations, input component 610 may transmit and/or receive packets. In some implementations, input component 610 may include an input line card that includes one or more packet processing components (e.g., in the form of integrated circuits), such as one or more interface cards (IFCs), packet forwarding components, line card controller components, input ports, processors, memories, and/or input queues. In some implementations, device 600 may include one or more input components 610.

Switching component 620 may interconnect input components 610 with output components 630. In some implementations, switching component 620 may be implemented via one or more crossbars, via busses, and/or with shared memories. The shared memories may act as temporary buffers to store packets from input components 610 before the packets are eventually scheduled for delivery to output components 630. In some implementations, switching component 620 may enable input components 610, output components 630, and/or controller 640 to communicate with one another.

Output component 630 may store packets and may schedule packets for transmission on output physical links. Output component 630 may support data link layer encapsulation or decapsulation, and/or a variety of higher-level protocols. In some implementations, output component 630 may transmit packets and/or receive packets. In some implementations, output component 630 may include an output line card that includes one or more packet processing components (e.g., in the form of integrated circuits), such as one or more IFCs, packet forwarding components, line card controller components, output ports, processors, memories, and/or output queues. In some implementations, device 600 may include one or more output components 630. In some implementations, input component 610 and output component 630 may be implemented by the same set of components (e.g., and input/output component may be a combination of input component 610 and output component 630).

Controller 640 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 640 may include one or more processors that can be programmed to perform a function.

In some implementations, controller 640 may include a RAM, a ROM, and/or another type of dynamic or static storage device (e.g., a flash memory, a magnetic memory, an optical memory, etc.) that stores information and/or instructions for use by controller 640.

In some implementations, controller 640 may communicate with other devices, networks, and/or systems connected to device 600 to exchange information regarding network topology. Controller 640 may create routing tables based on the network topology information, may create forwarding tables based on the routing tables, and may forward the forwarding tables to input components 610 and/or output components 630. Input components 610 and/or output components 630 may use the forwarding tables to perform route lookups for incoming and/or outgoing packets.

Controller 640 may perform one or more processes described herein. Controller 640 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 640 from another computer-readable medium or from another device via a communication interface. When executed, software instructions stored in a memory and/or storage component associated with controller 640 may cause controller 640 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
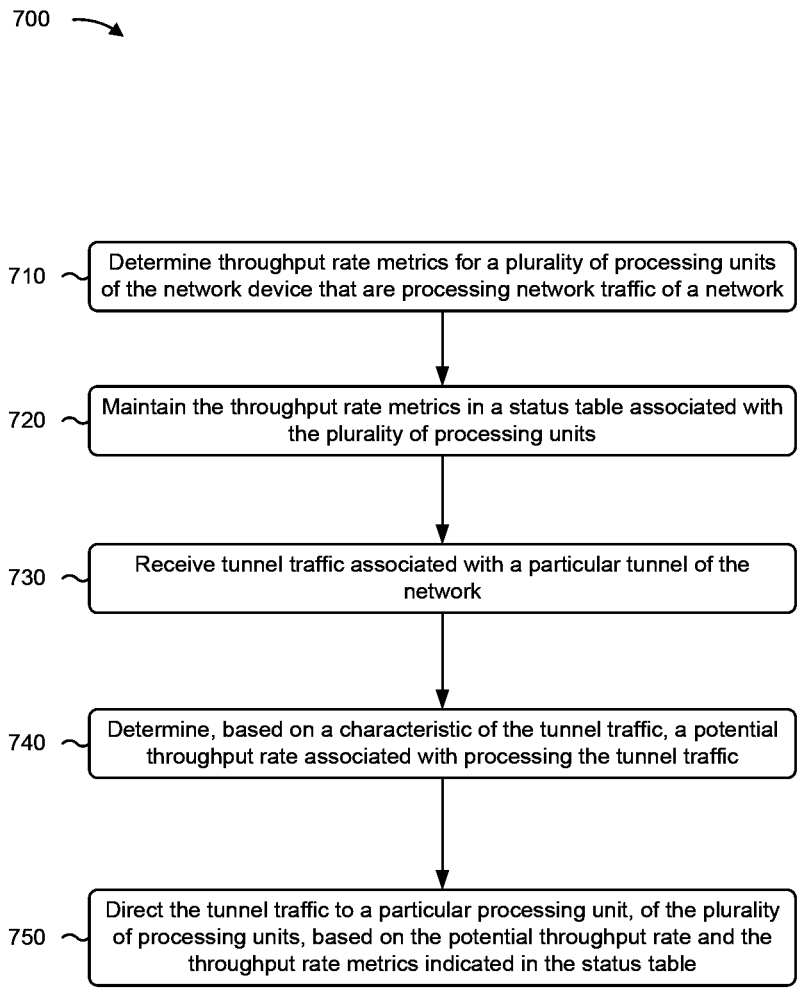
FIG. 7 is a flowchart of an example process relating to tunnel processing distribution based on traffic type and learned traffic processing metrics.

FIG. 7 is a flowchart of an example process 700 associated with tunnel processing distribution based on traffic type and learned traffic processing metrics. In some implementations, one or more process blocks of FIG. 7 may be performed by a network device (e.g., network device 420). In some implementations, one or more process blocks of FIG. 7 may be performed by another device or a group of devices separate from or including the network device, such as an endpoint device (e.g., endpoint device 410). Additionally, or alternatively, one or more process blocks of FIG. 7 may be performed by one or more components of device 500 and/or device 600, such as processor 520, memory 530, storage component 540, input component 550, output component 560, communication component 570, input component 610, switching component 620, output component 630, and/or controller 640.

As shown in FIG. 7, process 700 may include determining throughput rate metrics for a plurality of processing units of the network device that are processing network traffic of a network (block 710). For example, the network device may determine throughput rate metrics for a plurality of processing units of the network device that are processing network traffic of a network, as described above. The throughput rate metric for a processing unit may comprise a percentage of the maximum load that corresponds to a ratio of the current load to the maximum load.

In some implementations, determining the throughput metrics comprises looking up throughput rate metrics in a potential throughput rate table associated with the plurality of processing units, wherein the throughput rate metrics are maintained in the potential throughput rate table based on most recent measured throughput rates of the plurality of processing units.

In some implementations, determining the throughput rate metrics comprises, for a processing unit of the plurality of processing units, determining a maximum throughput rate of the processing unit at maximum load, determining a current load of the processing unit, and determining a throughput rate metric associated with the processing unit based on the current load and the maximum throughput rate. The throughput rate metric may comprise a percentage of the maximum load that corresponds to a ratio of the current load to the maximum load.

The maximum throughput rate may comprise at least one of a previous maximum throughput rate that was measured when the processing unit was previously at maximum load when processing traffic associated with the tunnel profile, or a previous maximum throughput rate that was measured when another processing unit of the plurality of processing units was previously at maximum load when processing traffic associated with the tunnel profile. The maximum throughput rate at the maximum load may be specific to a tunnel profile of traffic being processed by the processing unit.

In some implementations, determining the maximum throughput rate at the maximum load may comprise determining a set of tunnels associated with traffic being processed by the processing unit, determining individual characteristics of tunnels of the set of tunnels, determining, based on the individual characteristics and a quantity of the set of tunnels, a tunnel profile of the set of tunnels, and determining the maximum throughput rate based on the tunnel profile being mapped to the maximum throughput rate in a tunnel profile table.

In some implementations, the network device may determine a set of tunnels associated with traffic being processed by the processing unit. The network device may determine individual characteristics of the set of tunnels. The network device may determine, based on the individual characteristics and a quantity of the set of tunnels, a tunnel profile of the set of tunnels. The network device may determine the maximum throughput rate based on the tunnel profile.

As further shown in FIG. 7, process 700 may include maintaining the throughput rate metrics in a status table associated with the plurality of processing units (block 720). For example, the network device may maintain the throughput rate metrics in a status table associated with the plurality of processing units, as described above.

As further shown in FIG. 7, process 700 may include receiving tunnel traffic associated with a particular tunnel of the network (block 730). For example, the network device may receive tunnel traffic associated with a particular tunnel of the network, as described above.

As further shown in FIG. 7, process 700 may include determining, based on a characteristic of the tunnel traffic, a potential throughput rate associated with processing the tunnel traffic (block 740). For example, the network device may determine, based on a characteristic of the tunnel traffic, a potential throughput rate associated with processing the tunnel traffic, as described above. In some implementations, determining the potential throughput rate may comprise determining the characteristic, looking up the characteristic in a tunnel potential table that maps types of tunnel traffic to corresponding potential throughput rates, and determining the potential throughput rate from an entry that maps a type of traffic associated with the characteristic to the potential throughput rate.

As further shown in FIG. 7, process 700 may include directing the tunnel traffic to a particular processing unit, of the plurality of processing units, based on the potential throughput rate and the throughput rate metrics indicated in the status table (block 750). For example, the network device may direct the tunnel traffic to a particular processing unit, of the plurality of processing units, based on the potential throughput rate and the throughput rate metrics indicated in the status table, as described above. The particular processing unit, of the plurality of processing units, may be associated with a highest throughput rate metric of the throughput rate metrics for the plurality of processing units.

In some implementations, the particular processing unit is a first processing unit, and the network device may monitor a throughput rate associated with the first processing unit processing the tunnel traffic, may determine, based on the throughput rate not satisfying a throughput rate threshold, that the tunnel is experiencing an overload condition, and may redirect, from the first processing unit to a second processing unit, the tunnel traffic or other tunnel traffic associated with another tunnel of the network to address the overload condition. The second processing unit may be selected based on being associated with a highest potential throughput rate metric of the throughput rate metrics for the plurality of processing units.

In some implementations, determining that the tunnel traffic is experiencing the overload condition may comprise, for a particular time period, monitoring a quantity of outstanding packets, associated with the tunnel traffic, in a queue associated with the first processing unit, determining that the quantity of outstanding packets has increased during the particular time period, and determining that the tunnel traffic is experiencing the overload condition based on the quantity of outstanding packets has increased.

In some implementations, the network device detects the overload condition based on at least one of determining that the first throughput rate caused a utilization of the first processing unit to satisfy a utilization threshold that is associated with the first processing unit being overloaded, wherein the throughput rate metrics are determined based on determining that the first throughput rate caused the utilization to satisfy the utilization threshold, or determining that the first throughput rate decreased below a throughput rate threshold associated with the first tunnel traffic, wherein the throughput rate metrics are determined based on determining that the first throughput rate decreased below the throughput rate threshold.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a network device, throughput rate metrics for a plurality of processing units of the network device that are processing network traffic of a network;
    maintaining, by the network device, the throughput rate metrics in a status table associated with the plurality of processing units;
    receiving, by the network device, tunnel traffic associated with a particular tunnel of the network;
    determining, by the network device and based on a characteristic of the tunnel traffic, a potential throughput rate associated with processing the tunnel traffic; and
    directing, by the network device, the tunnel traffic to a particular processing unit, of the plurality of processing units, based on the potential throughput rate and the throughput rate metrics indicated in the status table.

2. The method of claim 1, wherein determining the throughput rate metrics comprises:
    for a processing unit of the plurality of processing units, determining a maximum throughput rate of the processing unit at maximum load;
        determining a current load of the processing unit; and
        determining a throughput rate metric associated with the processing unit based on the current load and the maximum throughput rate.

3. The method of claim 2, wherein the throughput rate metric comprises a percentage of the maximum load that corresponds to a ratio of the current load to the maximum load.

4. The method of claim 2, wherein determining the maximum throughput rate at the maximum load comprises:

determining a set of tunnels associated with traffic being processed by the processing unit;
determining individual characteristics of tunnels of the set of tunnels;
determining, based on the individual characteristics and a quantity of the set of tunnels, a tunnel profile of the set of tunnels; and
determining the maximum throughput rate based on the tunnel profile being mapped to the maximum throughput rate in a tunnel profile table.

5. The method of claim 1, wherein determining the potential throughput rate comprises:
determining the characteristic;
looking up the characteristic in a tunnel potential table that maps types of tunnel traffic to corresponding potential throughput rates; and
determining the potential throughput rate from an entry that maps a type of traffic associated with the characteristic to the potential throughput rate.

6. The method of claim 1, wherein the particular processing unit, of the plurality of processing units, is associated with a highest throughput rate metric of the throughput rate metrics for the plurality of processing units.

7. The method of claim 1, wherein the particular processing unit is a first processing unit, further comprising:
monitoring a throughput rate associated with the first processing unit processing the tunnel traffic;
determining, based on the throughput rate not satisfying a throughput rate threshold, that the tunnel is experiencing an overload condition; and
redirecting, from the first processing unit to a second processing unit, the tunnel traffic or other tunnel traffic associated with another tunnel of the network to address the overload condition.

8. The method of claim 7, wherein determining that the tunnel traffic is experiencing the overload condition comprises:
for a particular time period, monitoring a quantity of outstanding packets, associated with the tunnel traffic, in a queue associated with the first processing unit;
determining that the quantity of outstanding packets has increased during the particular time period; and
determining that the tunnel traffic is experiencing the overload condition based on the quantity of outstanding packets has increased.

9. A network device, comprising:
one or more memories;
a plurality of processing units; and
one or more processors to:
monitor a first throughput rate associated with first tunnel traffic being processed by a first processing unit of the plurality of processing units,
wherein the first tunnel traffic is associated with a first tunnel of a network;
detect, based on the first throughput rate, an overload condition associated with the first processing unit processing the first tunnel traffic;
determine, based on detecting the overload condition, throughput rate metrics for the plurality of processing units;
select, based on the throughput rate metrics and the first throughput rate, a second processing unit from the plurality of processing units; and
redirect, from the first processing unit to the second processing unit, the first tunnel traffic to the second processing unit.

10. The network device of claim 9, wherein the one or more processors, when determining the throughput rate metrics, are configured to:
for a processing unit of the plurality of processing units,
determine a maximum throughput rate of the processing unit at maximum load;
determine a current load of the processing unit; and
determine a throughput rate metric associated with the processing unit based on the current load and the maximum throughput rate.

11. The network device of claim 10, wherein the maximum throughput rate at the maximum load is specific to a tunnel profile of traffic being processed by the processing unit.

12. The network device of claim 9, wherein the one or more processors, when determining the throughput rate metrics, are to:
look up throughput rate metrics in a potential throughput rate table associated with the plurality of processing units,
wherein the throughput rate metrics are maintained in the potential throughput rate table based on most recent measured throughput rates of the plurality of processing units.

13. The network device of claim 12, wherein the second processing unit, of the plurality of processing units, is selected based on being associated with a highest potential throughput rate metric of the throughput rate metrics for the plurality of processing units.

14. The network device of claim 9, wherein the one or more processors, when detecting the overload condition, are to detect the overload condition based on at least one of:
determining that the first throughput rate caused a utilization of the first processing unit to satisfy a utilization threshold that is associated with the first processing unit being overloaded,
wherein the throughput rate metrics are determined based on determining that the first throughput rate caused the utilization to satisfy the utilization threshold; or
determining that the first throughput rate decreased below a throughput rate threshold associated with the first tunnel traffic,
wherein the throughput rate metrics are determined based on determining that the first throughput rate decreased below the throughput rate threshold.

15. A non-transitory computer-readable medium storing a set of instructions, the set of instructions comprising:
one or more instructions that, when executed by one or more processors of a network device, cause the network device to:
determine a maximum throughput rate of a processing unit at maximum load;
determine a current load of the processing unit;
determine a throughput rate metric associated with the processing unit based on the current load and the maximum throughput rate;
store the throughput rate metric and an identifier of the processing unit in a status table that is configured to maintain throughput rate metrics for a plurality of processing units of the network device; and
direct tunnel traffic, associated with a tunnel of a network, to the processing unit according to the throughput rate metrics indicated in the status table.

16. The non-transitory computer-readable medium of claim 15, wherein the throughput rate metric comprises a percentage of the maximum load that corresponds to a ratio of the current load to the maximum load.

17. The non-transitory computer-readable medium of claim 15, wherein the one or more instructions, that cause the network device to determine the maximum throughput rate at the maximum load, cause the network device to:
 determine a set of tunnels associated with traffic being processed by the processing unit;
 determine individual characteristics of the set of tunnels;
 determine, based on the individual characteristics and a quantity of the set of tunnels, a tunnel profile of the set of tunnels; and
 determine the maximum throughput rate based on the tunnel profile.

18. The non-transitory computer-readable medium of claim 17, wherein the one or more instructions, that cause the network device to determine the maximum throughput rate based on the tunnel profile, cause the network device to:
 look up the tunnel profile in a tunnel profile table that indicates maximum throughput rates for tunnel profiles; and
 determine the maximum throughput rate based on the maximum throughput rate being mapped to the tunnel profile in the tunnel profile table.

19. The non-transitory computer-readable medium of claim 17, wherein the maximum throughput rate comprises at least one of:
 a previous maximum throughput rate that was measured when the processing unit was previously at maximum load when processing traffic associated with the tunnel profile, or
 a previous maximum throughput rate that was measured when another processing unit of the plurality of processing units was previously at maximum load when processing traffic associated with the tunnel profile.

20. The non-transitory computer-readable medium of claim 15, wherein the one or more instructions, that cause the network device to direct the tunnel traffic to the processor, cause the network device to:
 determine, based on a characteristic of the tunnel traffic, a potential throughput rate associated with the tunnel;
 determine, based on looking up the throughput rate metric in the status table, that the potential throughput rate satisfies the throughput rate metric; and
 direct the tunnel traffic to the processing unit based on the potential throughput rate satisfying the throughput rate metric.

* * * * *